United States Patent [19]

Hofmann et al.

[11] Patent Number: 4,601,558

[45] Date of Patent: Jul. 22, 1986

[54] AUTOLOADING MICROFICHE READER

[75] Inventors: Wilfried Hofmann, Taufkirchen; Andreas Holzmann, Bruckberg; Adolf Koopmann, Munich; Ruth Meggendorfer, Unterhaching; Jürgen Sylla, Sauerlach-Arget, all of Fed. Rep. of Germany

[73] Assignee: Agfa-Gevaert Aktiengesellschaft, Leverkusen, Fed. Rep. of Germany

[21] Appl. No.: 702,877

[22] Filed: Feb. 19, 1985

[30] Foreign Application Priority Data

Mar. 2, 1984 [DE] Fed. Rep. of Germany ....... 3407707

[51] Int. Cl.⁴ .............................................. G03B 23/08
[52] U.S. Cl. ................................... 353/27 R; 353/114
[58] Field of Search .................. 353/25, 27 R, 27 A, 353/114, 116, DIG. 1, 103, 120; 209/547, 608, 610, 613, 612

[56] References Cited

U.S. PATENT DOCUMENTS

| | | | |
|---|---|---|---|
| 4,025,177 | 5/1977 | Owens et al. | 353/27 A |
| 4,049,342 | 9/1977 | Hearon | 353/27 R |
| 4,087,005 | 5/1978 | Kinsinger | 353/27 A X |
| 4,120,573 | 10/1978 | Johnston et al. | 353/27 A |
| 4,557,595 | 12/1985 | Freundt | 353/27 R X |

Primary Examiner—Harry N. Haroian
Attorney, Agent, or Firm—Michael J. Striker

[57] ABSTRACT

An apparatus for viewing microfiches held in a cassette has a housing defining a rear seat for the cassette holding the microfiches and having a front viewing area, an optical system on the housing for viewing a microfiche in the area, a holder constructed to carry one of the microfiches displaceable on the housing in the area with respect to the optical system for presenting selected portions of a microfiche carried by the holder to the optical system, and a selector in the housing for separating a selected microfiche in the cassette from the other microfiches in the cassette. A drive support is rotatable about and displaceable along an upright axis between the viewing area and the cassette-holding seat and has a pair of generally diametrally opposite arms having outer ends provided with respective drive rollers. The support is rotatable about its axis between a transport position with one roller engaged in the area and the other roller in the cassette in the seat and with the arms extending in a transport direction between the area and seat, and an out-of-service position extending transverse to the direction with neither roller in the area or in the seat. A motor rotates the rollers when the support is in the transport position in one rotational sense to displace a microfiche in the transport direction from the cassette in the seat to the holder in the area and in the opposite rotational sense to displace a microfiche from the holder in the area to the cassette in the seat.

9 Claims, 4 Drawing Figures

AUTOLOADING MICROFICHE READER

FIELD OF THE INVENTION

The present invention relates to a viewer or reader for microfiches. More particularly this invention concerns such an apparatus which can automatically load and unload a microfiche from a magazine of such fiches.

BACKGROUND OF THE INVENTION

A standard microfiche or microcard reader holds the fiches atop a transparent viewing plate which can be moved by the user to position the desired portion of the card in line with the optical system so it can be projected onto a viewing screen. In order to protect the cards from damage during handling, they are typically held in magazines or cassettes and the viewing apparatus is provided with mechanism that can select one of the cards, that is take it alone out of the cassette, and position it in the holder that the user maneuvers around to view the desired portion of the card.

These loading devices are normally relatively complicated and bulky. They therefore make the entire viewing apparatus fairly large, and also have the disadvantage that they frequently scratch the delicate card.

OBJECTS OF THE INVENTION

It is therefore an object of the present invention to provide an improved microfiche viewing apparatus.

Another object is the provision of such a microfiche viewing apparatus which overcomes the above-given disadvantages, that is which is relatively simple and compact and that nonetheless treats the cards gently.

SUMMARY OF THE INVENTION

An apparatus for viewing microfiches held in a cassette according to the invention has a housing defining a rear seat for the cassette holding the microfiches and having a front viewing area, an optical system on the housing for viewing a microfiche in the area, a holder constructed to carry one of the microfiches displaceable on the housing in the area with respect to the optical system for presenting selected portions of a microfiche carried by the holder to the optical system, and a selector in the housing for separating a selected microfiche in the cassette from the other microfiches in the cassette. A drive support is rotatable about and displaceable along an upright axis between the viewing area and the cassette-holding seat and has a pair of generally diametrally opposite arms having outer ends provided with respective drive rollers. The support is rotatable about its axis between a transport position with one roller engaged in the area and the other roller in the cassette in the seat and with the arms extending in a transport direction between the area and seat, and an out-of-service position extending transverse to the direction with neither roller in the area or in the seat. A motor rotates the rollers when the support is in the transport position in one rotational sense to displace a microfiche in the transport direction from the cassette in the seat to the holder in the area and in the opposite rotational sense to displace a microfiche from the holder in the area to the cassette in the seat.

This arrangement can even work effectively with book-type cassettes and with double-glass holders. The transport rollers, which are driven, can reach into these structures and gently remove or return a microfiche or similar card-type media, such a for example a floppy computer disk. The standard suction lifters or grippers are eliminated, and the device can function in very cramped spaces.

According to another feature of this invention an actuator is connected between the holder and the housing for rotating the holder between its positions and for raising it when in the out-of-service position. A solenoid arrangement can do this easily. In this arrangement the motor is carried on the support and is connected via a drive element to the rollers. These rollers are themselves constituted as pulleys over which the drive element is spanned and the motor includes a drive pulley engaging the element. Perfectly synchronous driving of the two rollers in the same direction is therefore certain.

Mechanism is provided in the housing for opening the cassette in the seat and the other roller is engaged in the open cassette in the transport position. The selector includes an idler roller displaceable into an upper position engaging underneath the selected microfiche in the cassette underneath the other roller in the transport position.

In addition according to this invention the housing includes a lower part having the seat and area and an upper part having the optical system. This upper part is pivotal on the lower part about an axis transverse to the direction between an open position exposing the seat for removal or insertion of a cassette and a closed position closing up the seat, the support and rollers being on the upper part. The upper housing part includes a mounting plate carrying the support and motor and pivotal on movement of the upper part into the open position into a position with the arms tipped up and out of the way of the seat. Tne selector is also carried on the mounting plate and is tipped up and out of the way of the seat in the open position of the upper part.

DESCRIPTION OF THE DRAWING

The above and other features and advantages will become more readily apparent from the following, reference being made to the accompanying drawing in which.

SPECIFIC DESCRIPTION

Figure 1:
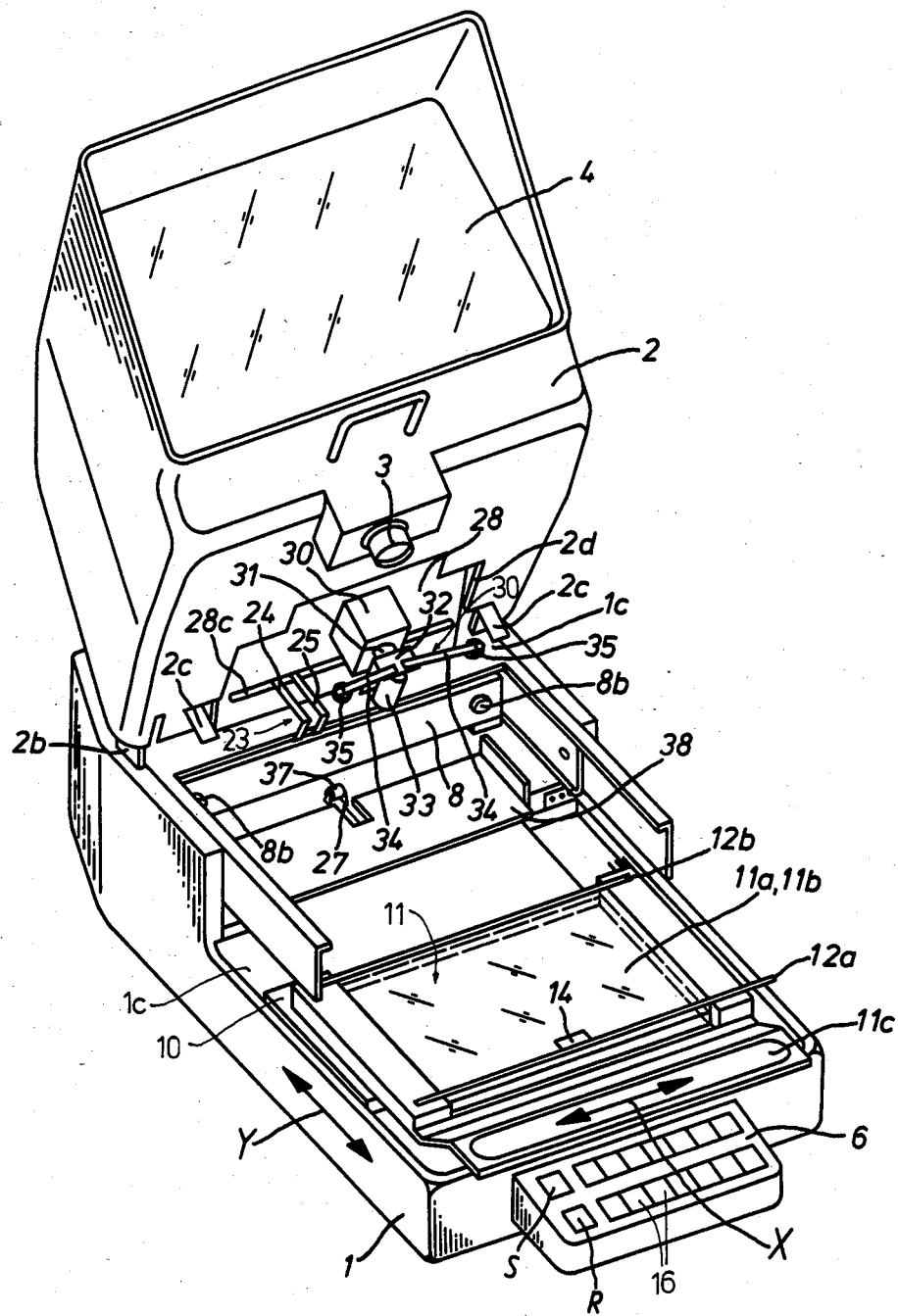
FIG. 1 is a perspective view with the apparatus opened.

The apparatus according to this invention basically has a housing formed by a lower housing part or base 1 and an upper housing part 2 secured at a horizontal rear pivot 2b on the base 1. This movable upper part 2 carries the standard lens system 3 that is effective through unillustrated mirrors to project an image on a screen 4 and that can move somewhat up and down against a light downwardly effective spring force. A lamp and focusing system 5 is provided in the base 1 in line with this lens arrangement 3. The front of the base 1 carries a keyboard 6 that selects microfiches 7 from a cassette or magazine 8, all under the supervision of a standard microcomputer-type controller 9. As is standard the front edges of the cards 7 in the cassette 8 are all differently notched so that a simple mechanical arrangement described in more detail below can select one of them. Although here only four fiches 7 are shown in the cassette 8, in reality twenty or even more can be accommodated. The control panel 6 normally has, in addition to its select button S and return button R, a number of buttons 16 equal to the number of fiches 7 in the cassette 8.

A fiche 7 to be viewed is held between upper and lower glass plates 11a and 11b that are supported by ball-type roller guides 10 on the bed 1e of the base 1. These plates 11a and 11b form a holder 11 that can be slid around in crosswise direction X or front-to-back direction Y to position the desired portion of the fiche 7 held between the plates 11a and 11b between the light source 5 and lens system 3. The plates 11a and 11b serve to hold the card 7 flat and protect it.

The front and rear edges of the upper plate 11a are provided with respective outwardly projecting pivot pins 12a and 12b extending parallel to each other in the direction X and received in respective upwardly open grooves 13a and 13b in the front and rear edges of the lower plate 11b. Thus the upper plate 11a can be pivoted up in the front to allow a fiche 7 to be inserted or removed manually, or can be pivoted up in the back as will be described below so that it can be automatically loaded and unloaded. This rearward opening can be done by ramp surfaces against which the ends of the pins 12b engage, or by pivotal forks 1b carried on the base 1 and positioned to lever up the rear edge of the sheet 11b when the sheets 11a and 11b are all the way back in the direction Y into the position shown in FIGS. 3 and 4. In addition a photocell 14 provided at the front edge of the top plate 11b coacts with a lamp 15 to let the controller 9 know if a fiche 7 is properly in position between the plates 11a and 11b.

Some microfiches are permanently secured in durable transparent envelopes, eliminating the necessity of the upper plate 11b and lifting arms 1b. The invention will function regardless of whether this upper plate 11b is in place or not.

The base 1 forms a seat or pocket 1a for receiving the cassette 8 which can be slid in on a drawer-type slide 21 to be held with a cover 8a of the cassette 8 on the bottom. The cover 8a is free to open only when two buttons 8b on the cassette's edge are depressed simultaneously. This is done by two tabs 2c provided on the underside of the pivotal top housing part 2 that engage and depress these buttons 8b when the top part 2 is in the down or closed position of FIGS. 3 and 4.

The bed 1e of the base 1 supports a guide plate 38 at the rear of the bed 1e, with a rear edge just below the front edge of the cassette 8 when same is fully inserted into the seat 1a of the base 1. The upper surface of this guide plate 38 is generally level with that of the lower plate 11a and its front and rear edges are beveled.

Figure 2:
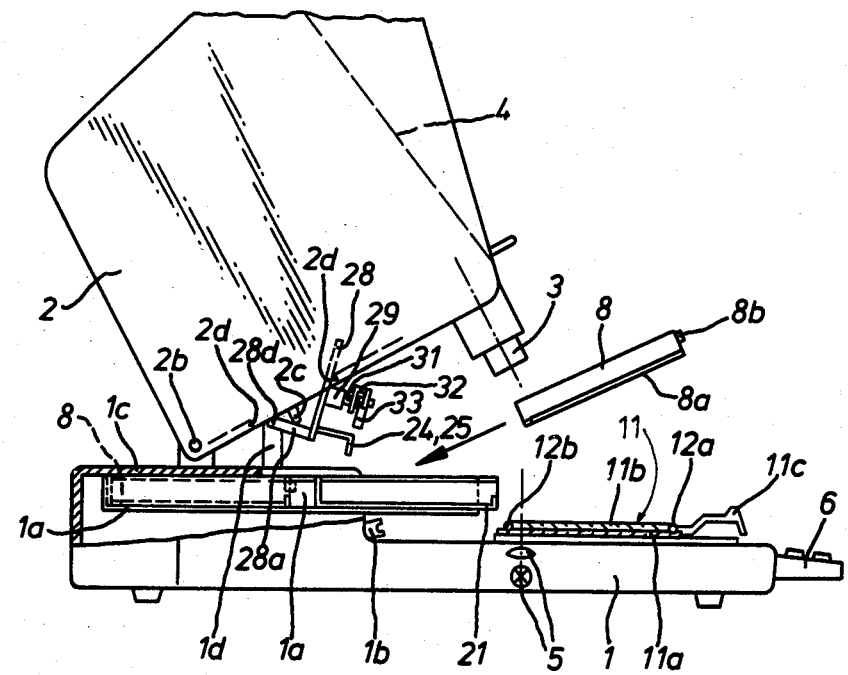
FIG. 2 is a partly sectional side view of the apparatus as shown in FIG. 1.

Thus a cassette 8 is loaded into the apparatus by pivoting the top part 2 up about its pivot 2 and then simply fitting the cassette 8 to the guide 21 and pushing it back into the seat 1a in the base 1, as indicated in FIG. 2. The top part 2 is then pivoted down and locked in place by latches not shown, automatically freeing the cassette lid 8a to pivot down. During such loading the plates 11a and 11b are pulled forward in the Y direction to the frontmost position also shown in FIGS. 1 and 2.

An eccentric 23 rotatable by a motor 16 operated by the controller 9 engages underneath the lid 8a of a loaded cassette 8 and can raise and lower it. This motor 16 rotates the eccentric 23 when, in response to the actuation of the buttons S or R, a fiche 7 is being withdrawn from or returned to the cassette 8. In addition the eccentric 23 is in its highest position during loading and unloading of a cassette 8 so that, even though the latch buttons 8b on the cassette 8 are depressed when the housing 1, 2 is closed, opening of the lid 8a is impossible.

A mounting plate 28 extends through a large hole 2d in the bottom wall 2a of the top part 2 and has a front portion resting inside the part 2 on the wall 2a and a rear portion provided with two upstanding arms 28a pivoted at their upper ends at 28d on respective arms 1d projecting up from the top wall 1c of the base 1. The pivots 2b and 28d are parallel but are offset such that when the top part 2 is pivoted up the plate 28 moves from a position flat on the bottom wall 2a to a position extending at an angle thereto.

This plate 28 is formed with a transverse slot 28c and is provided thereover with a servo unit 28b that can move two or more L-shaped selector arms 24 and 25 across the front edge of the cassette 8, that is in the direction X, and also can pivot at least one of them limitedly about an axis parallel to the axes of the pivots 2b and 28d. These elements form a selector mechanism 23. As mentioned above the fiches 7 have differently cut edges, with the card 7 on the top of the pile in the cassette 8a normally having a continuous edge, the card 7 on the bottom of the pile having a short tab projecting from one end of its front edge, and the other cards having tabs of different and stepped respective widths.

The servo 28b can therefore move the two selectors 24 and 25 along the edge of the cassette 8 until the selector 24 is underneath the edge of the tab of the card 7 desired while the selector 25 is underneath the edge of the tab of the overlying card 7. It is possible to provide a number of selectors equal to the number of cards 7 also, in which case all but two are pivoted out of the way to select a given card. The card selection is made at the keyboard 6. When the top part 2 is raised, these selector fingers 24 and 25 are pivoted automatically forward and out of the way as the plate 28 carrying them pivots.

Figure 3:
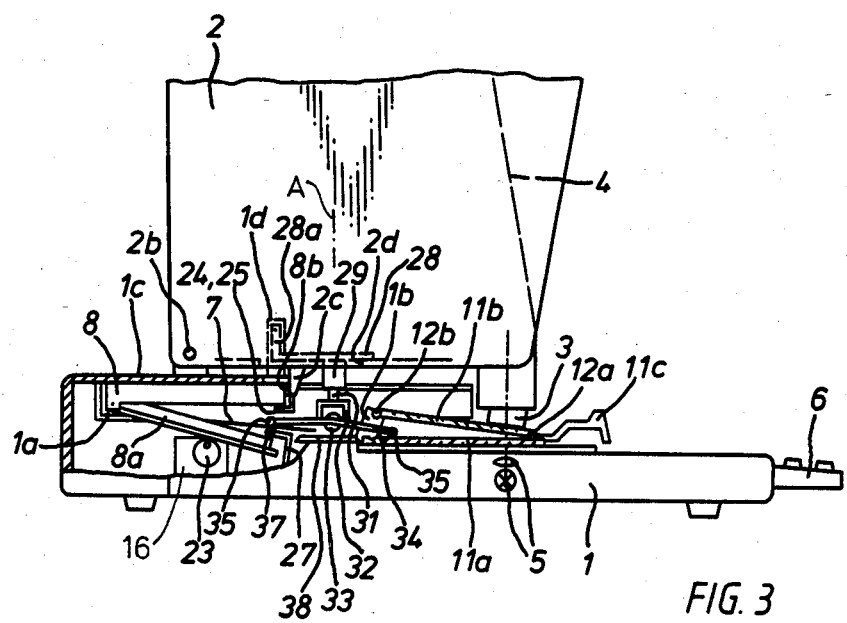
FIG. 3 is a partly sectional side view of the apparatus in the closed position.

Another actuator or servomechanism 27 in the base 1 can pivot an arm 27 carrying a roller 37 from a forward out-of-the-way position to a rearward position illustrated in FIGS. 1, 2, and 3, underneath the cassette 8. This actuator 17 is operated by the controller 9 also to move into the upper position only after the cassette 8a has been opened and the selectors 24 and 25 are holding up only the desired card 7 and the cards 7 above it.

The plate 28 also carries a card-drive unit 30 having a rotary and linear solenoid-type actuator 29 connected to a shaft 31 centered on an axis A that is perpendicular to the plate 28 and that is vertical and also perpendicular to the directions X and Y in the closed position of the top part 2. This shaft 31 is axially displaceable and rotatable in a support yoke 30 on the plate 28 and on its lower end carries a support 32 from which two arms 34 extend diametrally opposite each other. Each arm 34 carries on its outer end a small roller 35 that is grooved and driven by a cable or belt 36 from a drive pulley 33a carried on a motor 33 also mounted on the support 32. The motor 33 can rotate the two rolls 35 synchronously in either direction about their respective parallel rotation axes that define a plane perpendicular to the axis A. When the actuator 29 is energized it raises and rotates the shaft 31 so that in the upper position the arms 34 extend in the direction X and in the lower position in the direction Y that is offset 90° thereto.

In a starting position a full cassette 8 is in position in the holder 1a and the top part 2 is closed down. In addition the arms 34 extend in the direction X and are lifted relatively close to the bottom wall 2a of the top part 2. From this starting position a fiche 7 is viewed as follows:

First of all the holder 11 is pushed all the way into the central rear position. As it is moved into this position the forks 1b engage the projecting ends of the rods 12b lever up the rear edge of the top plate 11b, pressing the spring-loaded lens system 3 up somewnat. This opens the holder 11 to the rear. When in this fully back position the holder 11 normally actuates a switch to indicate a ready condition to the controller 9.

Then one of the buttons of the keyboard 6 is actuated to move the fingers 24, 25 into position with the finger 24 under the edge of the tab of the desired card 7, whereupon a timing circuit actuates the motor 16 to open the cassette 8 down, leaving the desired card 7 supported only by the finger 24, all the cards in the stack above it held up by the other finger 25, and all the cards below it lying on the dropped lid 8a. The lower idler roller 27 is then moved into place below the fingers 24 and 25 and the finger 24 is pivoted back to drop the selected card onto the roller 37.

Figure 4:
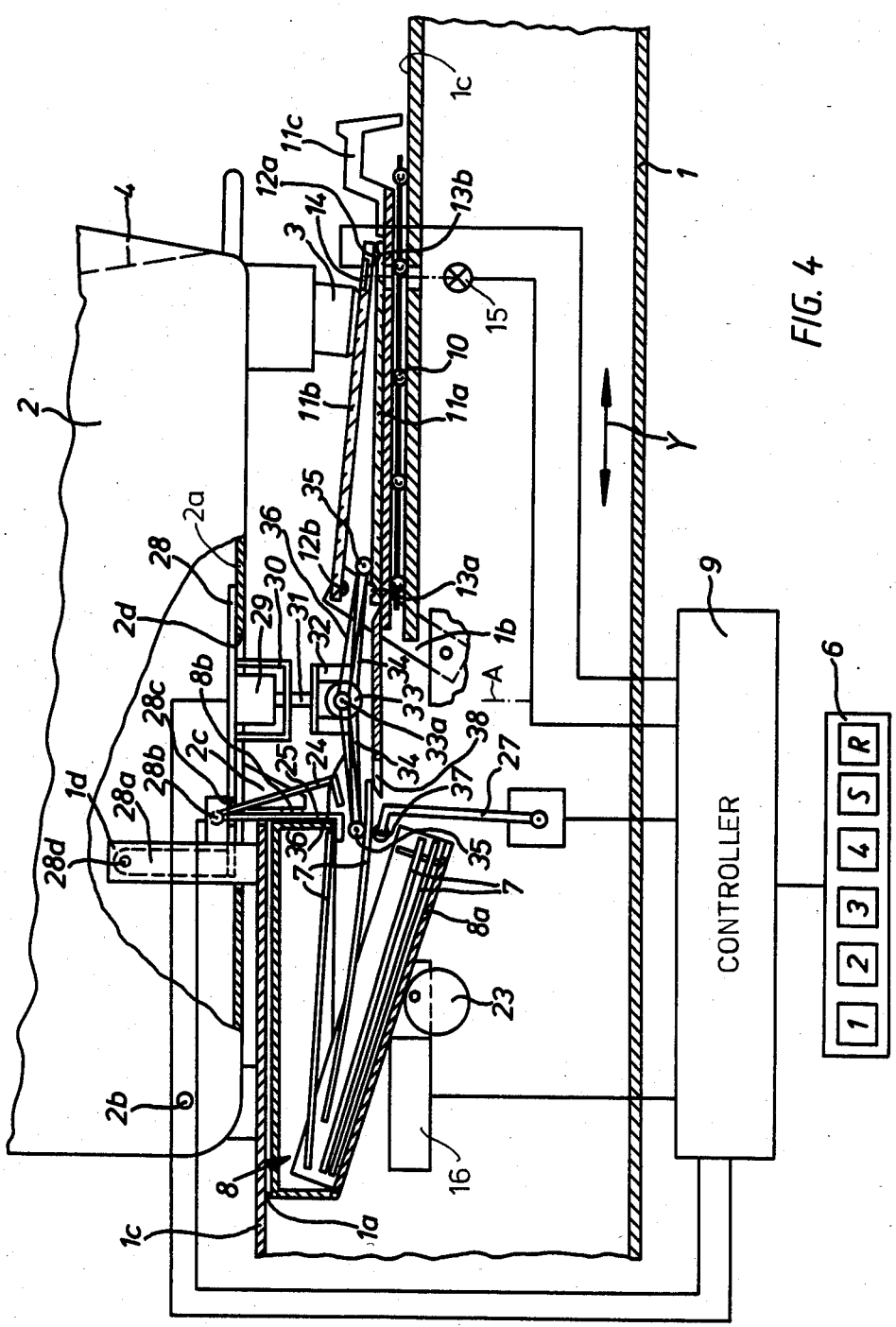
FIG. 4 is a partly section large-scale and schematic view of the apparatus.

The motor 29 then rotates and drops the support 32 to press the rear roller 35 down onto the selected card 7 just over the roller 37 it is resting on. Once the card 7 is thus lightly pinched between the rear roller 36 and the idler roller 37, the motor 33 rotates the two rollers 35 counterclockwise as seen in FIG. 4 for enough time to push the pinched card 7 all the way forward between the two plates 11a and 11b, into a position detected by the photocell 14.

Thereupon the actuator 29 rotates the support 32 back tnrough 90° and raises up the entire drive unit 30. In this position the holder 11 can be pulled back toward the front for viewing of the desired portion of the selected card. The motor 16 can close the cassette 8, and the finger 25 can stay in place.

Once the user is finished with the card 7 the holder 11 is again pushed all the way back, automatically opening itself up to the rear, and the return button R is depressed. Once again the motor 16 opens the cassette 8 down if it has been closed, with those cards that are supposed to be atop the card being returned still being held up by the finger 25.

The actuator 17 raises the lower roller 37 and the actuator 29 rotates and lowers the rollers 35 so that the front roller 35 comes lightly down atop the card 7 lying on the lower glass 11a. The motor 33 then rotates the rollers 35 clockwise to push the card 7 on the sheet 11a back over the guide 38 until this card is pinched between the rear roller 35 and the idler roller 37 which are also rotating to push the card 7 back into the cassette 8.

The controller 9 then automatically closes the cassette 8 and rotates and raises the drive unit 30. The cycle can be repeated again with the same or another card.

With this system, therefore, the cards 7 can all be protected inside the cassette 8 or holder 11 except for the short time when a card is being taken out of or returned to the cassette 8. The pivotal drive unit 30 allows the front edge of the cassette 89 to be very close to the rear edge of the holder 11, making the apparatus very compact. In addition providing the selector 23 and the drive unit 30 on the plate 28 ensures that this mechanism will be pivoted up and out of the way during loading or withdrawing of a cassette 8, protecting this mecnanism from damage during this procedure.

The pivotal drive unit 30 of this invention could also be used in other retrieval and return systems. The cassette or stack could be next to the viewer, or the arrangement could work with computer disks or other media. It is also possible to provide a cassette that is open at both ends, so that the top housing part 2 need not tip. Projecting tabs at the ends of the cards could be gripped directly by the roller 35 and the roller 37, and the cassette 8 can have a leveling device that always vertically positions the desired card level with the nip defined between these rollers.

What is claimed is:

1. An apparatus for viewing microfiches held in a cassette, the apparatus comprising:
    a housing defining a rear seat for the cassette holding the microfiches and having a front viewing area;
    optical means on the housing for viewing a microfiche in the area;
    a holder constructed to carry one of the microfiches displaceable on the housing in the area with respect to the optical means for presenting selected portions of a microfiche carried by the holder to the optical means;
    selector means in the housing for separating a selected microfiche in the cassette from the other microfiches in the cassette;
    a drive support rotatable about and displaceable along an upright axis between the viewing area and the cassette-holding seat and having a pair of generally diametrally opposite arms having outer ends provided with respective drive rollers, the support being rotatable about its axis between a transport position with one roller engaged in the area and the other roller in the cassette in the seat and with the arms extending in a transport direction between the area and seat, and an out-of-service position extending transverse to the direction with neither roller in the area or in the seat; and
    motor means for rotating the rollers when the support is in the transport position in one rotational sense to displace a microfiche in the transport direction from the cassette in the seat to the holder in the area and in the opposite rotational sense to displace a microfiche from the holder in the area to the cassette in the seat.

2. The viewing apparatus defined in claim 1, further comprising
    actuator means connected between the holder and the housing for rotating the holder between its positions and for raising it when in the out-of-service position.

3. The viewing apparatus defined in claim 1 wherein the motor means is carried on the support and is connected via a drive element to the rollers.

4. The viewing apparatus defined in claim 3 wherein the rollers are constituted as pulleys over which the drive element is spanned and the motor includes a drive pulley engaging the element.

5. The viewing apparatus defined in claim 1, further comprising:
    means in the housing for opening the cassette in the seat, the other roller being engaged in the open cassette in the transport position.

6. The viewing apparatus defined in claim 1 wherein the selector means includes an idler roller displaceable into an upper position engaging underneath the selected microfiche in the cassette underneath the other roller in the transport position.

7. The viewing apparatus defined in claim 1 wherein the housing includes a lower part having the seat and area and an upper part having the optical means, the upper part being pivotal on the lower part about an axis transverse to the direction between an open position exposing the seat for removal or insertion of a cassette and a closed position closing up the seat, the support and rollers being on the upper part.

8. The viewing apparatus defined in claim 7 wherein the upper housing part includes a mounting plate carrying the support and motor means and pivotal on movement of the upper part into the open position into a position with the arms tipped up and out of the way of the seat.

9. The viewing apparatus defined in claim 8 wherein the selector means is also carried on the mounting plate and is tipped up and out of the way of the seat in the open position of the upper part.

* * * * *